(12) United States Patent
Park et al.

(10) Patent No.: US 7,680,011 B2
(45) Date of Patent: Mar. 16, 2010

(54) WRITE-ONCE RECORDING MEDIUM HAVING A DATA STRUCTURE FOR MANAGING RECORDING OF THE RECORDING MEDIUM, AND METHODS AND APPARATUSES FOR RECORDING ON A RECORDING MEDIUM

(75) Inventors: Sung Wan Park, Suwon-si (KR); Si Jung Noh, Ulsan-si (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1352 days.

(21) Appl. No.: 11/119,915

(22) Filed: May 3, 2005

(65) Prior Publication Data

US 2005/0249076 A1 Nov. 10, 2005

(30) Foreign Application Priority Data

May 4, 2004 (KR) ............... 10-2004-0031257

(51) Int. Cl.
*G11B 7/00* (2006.01)
(52) U.S. Cl. .................................. 369/59.25
(58) Field of Classification Search ............... None
See application file for complete search history.

(56) References Cited

U.S. PATENT DOCUMENTS

| | | | | |
|---|---|---|---|---|
| 3,571,500 A | * | 3/1971 | Nassimbene | 360/84 |
| 5,778,257 A | * | 7/1998 | Tsukatani et al. | 710/74 |
| 7,313,065 B2 | * | 12/2007 | Park | 369/53.15 |
| 7,317,670 B2 | * | 1/2008 | Park | 369/53.15 |
| 7,372,792 B2 | * | 5/2008 | Park | 369/47.22 |
| 7,602,689 B2 | * | 10/2009 | Park | 369/59.25 |
| 2003/0210623 A1 | * | 11/2003 | Fukuchi | 369/47.31 |
| 2004/0027946 A1 | | 2/2004 | Yoshimoto et al. | |
| 2004/0027952 A1 | | 2/2004 | Yoshimoto et al. | |
| 2004/0213092 A1 | * | 10/2004 | Ueda et al. | 369/30.03 |
| 2005/0105430 A1 | * | 5/2005 | Takashima | 369/53.2 |

FOREIGN PATENT DOCUMENTS

JP 2003-317243 11/2003

OTHER PUBLICATIONS

International Search Report dated Dec. 1, 2005.

* cited by examiner

*Primary Examiner*—Wayne R Young
*Assistant Examiner*—Adam R Giesy
(74) *Attorney, Agent, or Firm*—Harness, Dickey & Pierce (57) ABSTRACT

A user data area of the recording medium is at least partially divided into separate recording areas such that data recorded in a separate recording area is of a same type. For example, at least one of the separate recording areas may be storing managing information for managing the recording medium. Additionally, at least two separate recording areas may be for recording different types of data. For example, at least one of the separate recording areas may be storing managing information for managing the recording medium, and at least another one of the separate recording areas is for storing a copy of the data in the at least one of the separate recording areas for storing management information.

20 Claims, 11 Drawing Sheets

WRITE-ONCE RECORDING MEDIUM HAVING A DATA STRUCTURE FOR MANAGING RECORDING OF THE RECORDING MEDIUM, AND METHODS AND APPARATUSES FOR RECORDING ON A RECORDING MEDIUM

FOREIGN PRIORITY INFORMATION

This application claims the benefit of priority on Korean Application No. 10-2004-0031257, filed on May 4, 2004, which is hereby incorporated by reference in its entirety.

BACKGROUND OF THE INVENTION

1. Field of the Invention

The present invention relates to recording media and methods and apparatuses associated therewith.

2. Discussion of the Related Art

Generally, an optical disc on which a large amount of data is recordable is widely used as an optical record medium. Recently, many efforts have been made to develop a new high density optical record medium (HD-DVD), on which video data of high definition and audio data of high quality can be recorded and stored, such as a Blu-ray disc (hereinafter abbreviated BD) and the like.

The Blu-ray disc (BD) as a next generation HD-DVD technology is a next generation optical recording solution enabling the storage of data that remarkably surpasses DVDs, and the technology specifications of global standards for BDs are presently being established together with standards for other associated digital equipment.

Moreover, although many efforts have been made to develop optical recorder/players adopting the BD specifications, there are many difficulties in developing a complete optical recorder/player since the BD specifications have yet to be fully established.

For example, in order to efficiently reproduce the data recorded in a BD, a file system for managing files of the recorded data should be provided.

However, the current BD specifications do not have a completed unified specification for the file system, and this has limited development of full-scale Blu-ray disc (BD) based optical recorders/players.

SUMMARY OF THE INVENTION

The present invention relates to a write-once recording medium having a data structure for managing recording of the recording medium, and also to methods and apparatuses for recording a write-once recording medium.

In one embodiment, a user data area of the recording medium is at least partially dividable into separate recording areas. Here, each separate recording area is for recording data such that data recorded in a separate recording area is of a same type. For example, at least one of the separate recording areas may be for storing managing information for managing the recording medium In another embodiment, each separate recording area is for recording data such that data recorded in a separate recording area is of a same type, and at least two of the separate recording areas are for recording different types of data. For example, at least one of the separate recording areas may be for storing managing information for managing the recording medium, and at least another one of the separate recording areas may be for storing a copy of the data in the at least one of the separate recording areas for storing management information.

In yet another embodiment associated with any of the above-described embodiments, the user data area is partially dividable into the separate recording areas prior to recording such that the separate recording areas are pre-allocated.

In an additional embodiment, a user data area of a write-once recording medium is at least partially dividable into separate recording areas prior to recording in the user data area such that the separate recording areas are pre-allocated for recording data. At least two of the separate recording areas are for respectively recording different data types.

In an embodiment of a recording method of a write-once recording medium according to the present invention, separate recording areas of a user data area on the recording medium are allocated such that data recorded in a separate recording area is of a same type. Here, the at least two of the separate recording areas may be for respectively recording different types of data.

Another embodiment includes pre-allocating separate recording areas of a user data area on the recording medium such that at least two of the separate recording areas are for respectively recording different types of data.

In an embodiment of a recording apparatus for a write-once recording medium according to the present invention, the apparatus includes a driver for driving a recording element, and a controller controlling the driver to separate a user data area of the recording medium into separate recording areas. Here, each separate recording area is for recording data such that data recorded in a separate recording area is of a same type.

In another embodiment, a controller controls the driver to separate a user data area of the recording medium into separate recording areas such that at least two of the separate recording areas are pre-allocated for respectively recording different types of data.

In the above described embodiments, the user data area may be a volume space that does not include a spare area, where the spare area is an area of the recording medium for defect management.

Also, in the above described embodiments, the user data area may be a volume space lying between two spares areas of the recording medium, the two spare areas being for defect management.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EXAMPLE EMBODIMENTS

Reference will now be made in detail to example embodiments of the present invention, which are illustrated in the accompanying drawings. Wherever possible, the same reference numbers will be used throughout the drawings to refer to the same or like parts.

Figure 1:
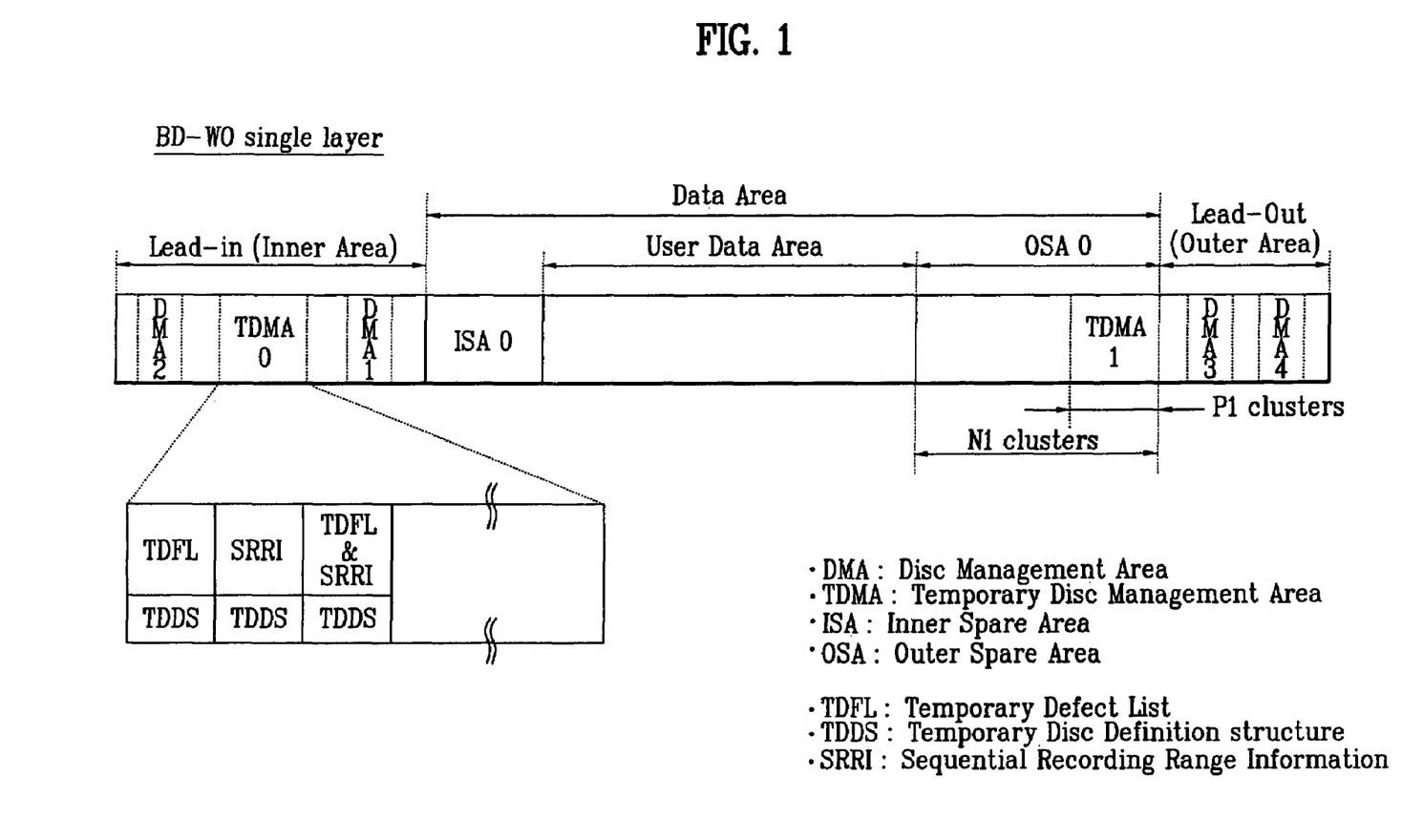
FIG. 1 is a diagram of a single-layer structure of a write-once optical disc according to an embodiment of the present invention.

FIG. 1 is a diagram of a single-layer structure of a write-once optical disc according to an embodiment of the present invention. However, it will be understood that the present invention is not limited to a single-layer structure write-once optical disc or a write-once optical disc as the recording medium.

The write-once optical disc according to this embodiment of the present invention is provided with spare areas (ISA0 and OSA0) for defect management, a user data area providing a volume space disposed between the spare areas ISA0 and OSA0, temporary disc management areas (hereinafter abbreviated TDMA) TDMA0 and TDMA1 for recording management information prior to disc finalization or disc closing, and disc management areas (hereinafter abbreviated DMA) DMA1, DMA2, DMA3 and DMA4 for recording final management information on disc finalization.

General management information indicating a recording state within the disc may co-exist in the TDMA along with the defect management information that develops in using the disc. Once the disc is finalized, recording cannot be further performed on the corresponding disc. In this case, final management information within the TDMA is transferred to the DMA.

The TDMA may be categorized into two types. The first type of TDMA is, for example, TDMA0 having a fixed size (e.g., 2,048 clusters) within a lead-in area allocated on disc initialization and is to be used first. The second type of TDMA is, for example, TDMA1 having a variable size (P1 clusters) forming part of the OSA0. The OSA0 also has a variable size (N1 clusters) and is formed within a data area of the disc. Whether the TDMA1 is to exist is decided on at disc initialization. Once the TDMA0 is completely allocated (e.g., used), the TDMA1 may be used.

Disc management information is recorded in the TDMA (TDMA0, TDMA1). The management information recorded in the TDMA of the write-once optical disc according to an embodiment of the present invention is shown at the lower left portion of FIG. 1. The same management information may be recorded in each of the TDMA0 and the TDMA1. For convenience of explanation, FIG. 1 illustrates a case that the management information is recorded in the TDMA0 only.

The disc management information is categorized into three types. A first type is defect management information such as a TDFL (temporary defect list) for recording a defect list. For example, the TDFL provides a list of the defective areas of the disc and the corresponding replacement areas in the spare areas. A second type of disc management information is SRRI (sequential recording range information) that informs a recording state within a disc in sequential recording mode. This type of management information will be discussed in greater detail below with respect to FIGS. 2A-4 and 7A-8. A third type of disc management information is TDDS (temporary disc definition structure), which includes pointers designating addresses of the latest (and therefore, most current) TDFL and SRRI. In case that a recording system within a disc is a random recording mode, a SBM (space bitmap) would be recorded instead of the SRRI.

The various management information discussed above will be recorded in the TDMA each time an update is required. For example, each time a defect is determined and replaced with a spare area, the TDFL may be updated. As another example, since the TDDS includes pointers to the latest TDFL and SRRI, the TDDS is recorded together with the recording of an updated TDFL or an updated SRRI. In recording, a record size in this embodiment corresponds to a size of one sector.

If a recordable user data area or TDMA no longer exists on a disc (e.g., the area is full) or if a user intends not to perform further recording on the disc, the disc is finalized or closed. In doing so, the final management information last recorded within the TDMA is transferred to one or more DMAs on the disc.

The SRR (sequential recording range) allocated to a disc for a sequential recording mode in a write-once optical disc and a recording system using the SRR according to embodiments of the present invention are explained in detail below.

In at least one embodiment, an 'SRR (sequential recording range)' is an area of the disc (e.g., a write-once optical disc such as a BD-WO (Blu-ray disc write once)) allocated for the recording. Establishing SRR according to embodiments of the present invention will be explained with reference to FIGS. 2A to 3C below.

FIGS. 2A to 2D show open SRR types. 'Open SRR' means an SRR area on which recording may take place—also referred to as enabled for recording. In this case, 'enabling a recording' may also mean that the SRR has 'NWA' (next writable address) information. Hence, an open SRR has NWA information. On the other hand, a non-writable SRR, which is not provided with a NWA, is called a closed SRR. And, the closed SRR will be explained with reference to FIGS. 3A to 3C later.

Figure 2A:
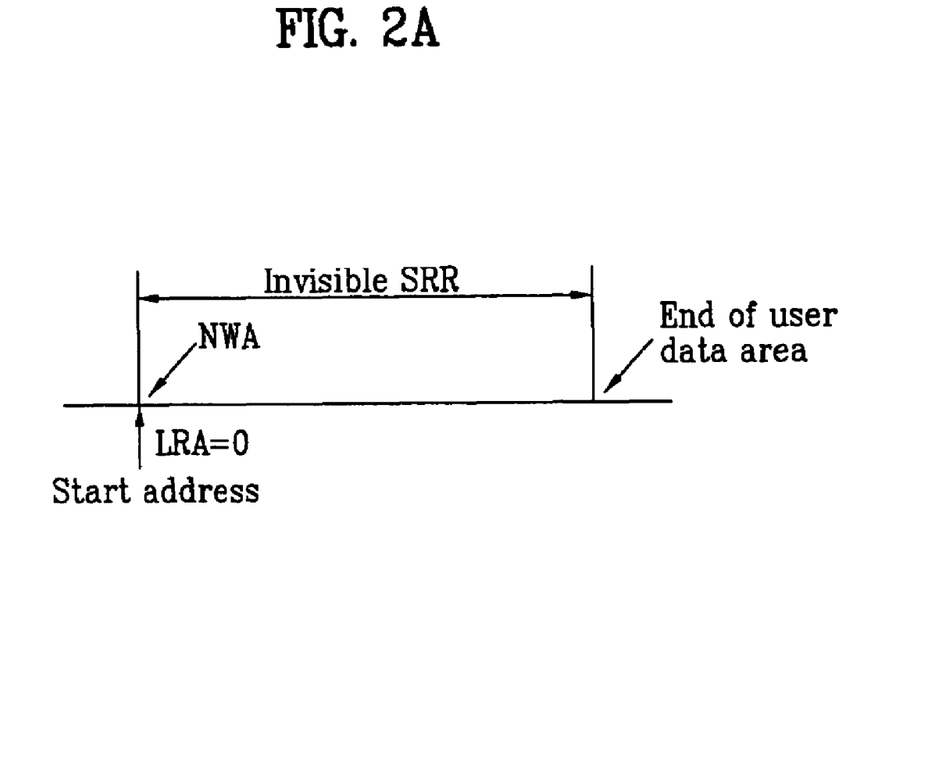
FIGS. 2A to 2D are diagrams of various open SRR types in a write-once optical disc according to embodiments the present invention.

FIG. 2A shows an invisible SRR as a first type of open SRR. The invisible SRR is an SRR formed on a most outer circumference section of a disc or an initial blank disc, and is an area where a recording is not performed yet. Namely, in the invisible SRR only a start address is defined, and an end of the SRR may become an end of the user data area. The invisible SRR has a 'LRA (last recorded area)=0' indicating an address of a last recorded area as an area where recording has not been performed yet, and the invisible SRR has a NWA with a value equal to the start address.

Figure 2B:
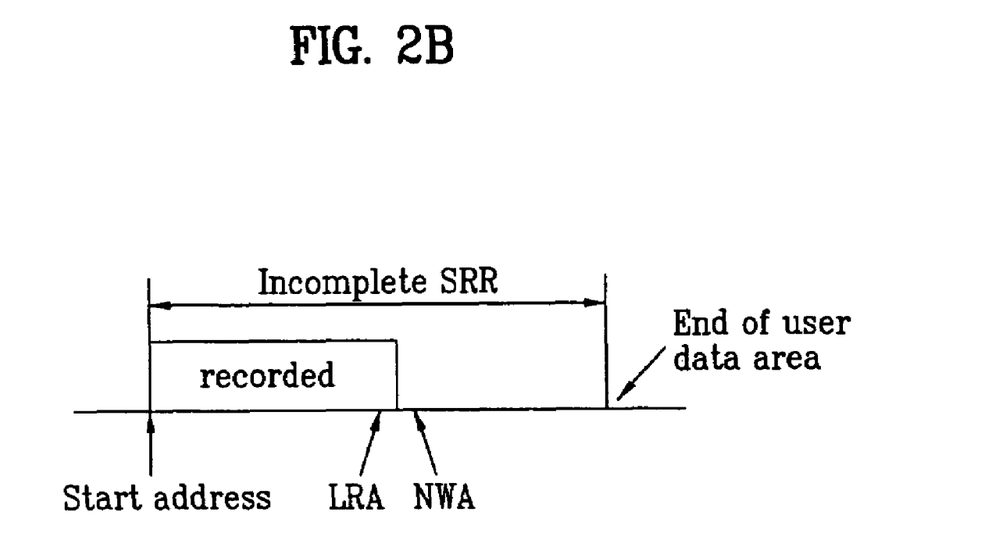

FIG. 2B shows an incomplete SRR as a second type of open SRR. The incomplete SRR is a partially recorded area; for example, an invisible SRR such as in FIG. 2A that has been partially recorded on. The incomplete SRR, like the invisible SRR, has a start address only and an end of the SRR may become an end of the user data area. Yet, the LRA of the incomplete SRR indicates a last address where data was recorded, and the NWA of the incomplete SRR points to a head position of a cluster next to the LRA (e.g., the next cluster following the LRA where recording may take place).

Figure 2C:
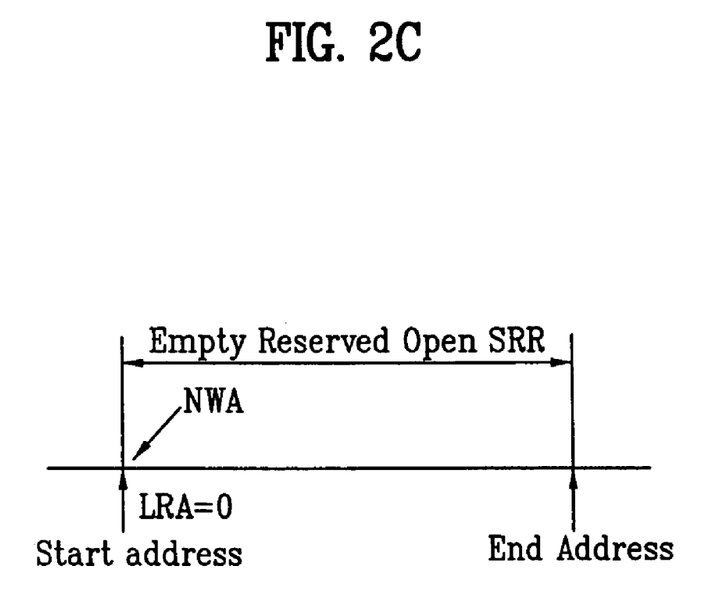

FIG. 2C shows an empty, reserved open SRR as a third type of open SRR. Unlike the invisible SRR of FIG. 2A or the incomplete SRR of FIG. 2B, the empty, reserved open SRR is an SRR formed on an intermediate area within a disc instead of a most outer circumference. Namely, the empty, reserved open SRR corresponds to the case that a recording has not yet been performed; for example, after a host or user has formed the open SRR for recording. The empty, reserved open SRR has a start address and an end address. Yet, since recording has not yet been performed in the SRR, the SRR has a 'LRA=0' and a NWA with the same value as the start address of the SRR.

Figure 2D:
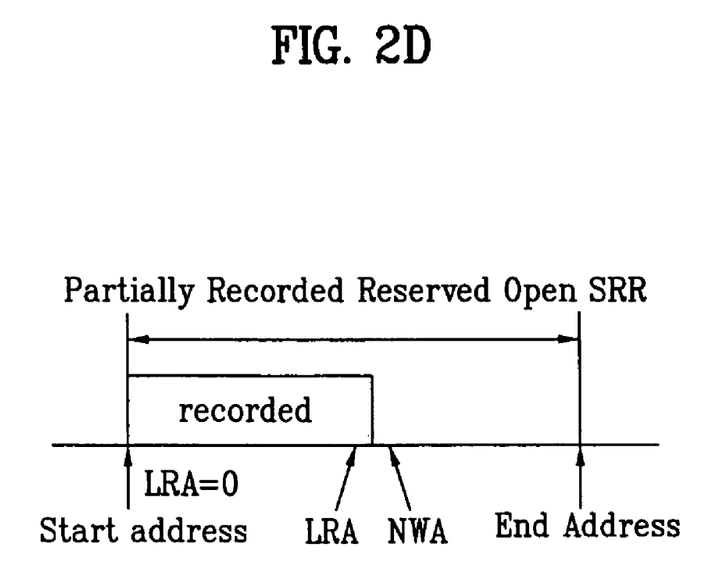

FIG. 2D shows a partially recorded, reserved open SRR as a fourth type of open SRR. The partially recorded, reserved open SRR is an SRR such as in FIG. 2C that has been partially recorded on. Hence, the partially recorded, reserved open SRR has a start address and an end address. The LRA of this SRR indicates the last address at which data was recorded, and the NWA of the SRR points to a head position of a cluster next to the LRA (e.g., the next cluster following the LRA where recording may take place).

The number of the above-explained open SRRs may be limited in a write-once disc. For example, according to one embodiment of the present invention, a maximum of sixteen open SRRs are allowed to exist within the disc.

Figure 3A:
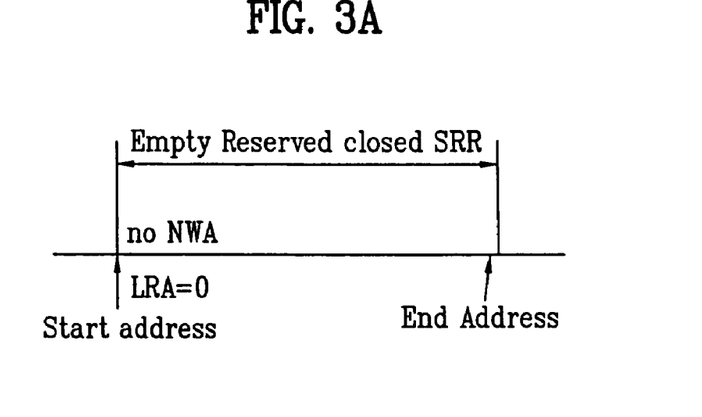
FIGS. 3A to 3C are diagrams of various closed SRR types in a write-once optical disc according to embodiments of the present invention.
Figure 3B:
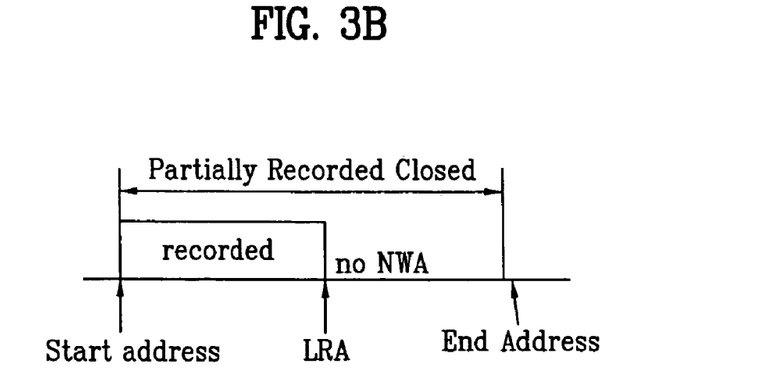
Figure 3C:
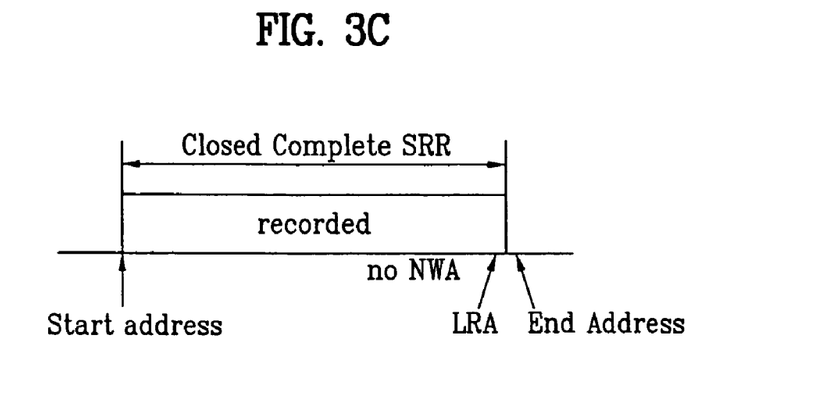

FIGS. 3A to 3C are diagrams of various types of closed SRRs. A closed SRR is an SRR where a recording is no longer permitted or possible. For example, in a closed SRR, the 'NWA (next writable address)' information may not be provided. The closed SRR may be generated as a result of the completed recording on the SRR area. Besides, even if writable area exists in the SRR area, the area can be forcibly closed by a closing command of a user or host.

FIG. 3A shows an empty, reserved closed SRR as a first type of closed SRR. The empty, reserved closed SRR is an SRR that is closed by a closing command without having been recorded in when the SRR was an empty open SRR.

FIG. 3B shows a partially recorded closed SRR as a second type of closed SRR. The empty closed SRR is an SRR that is closed by a closing command after having been partially recorded in when the SRR was a partially recorded open SRR.

FIG. 3C shows a complete closed SRR as a third type of closed SRR. The complete closed SRR is an SRR where data completely fills the SRR area.

Figure 9:
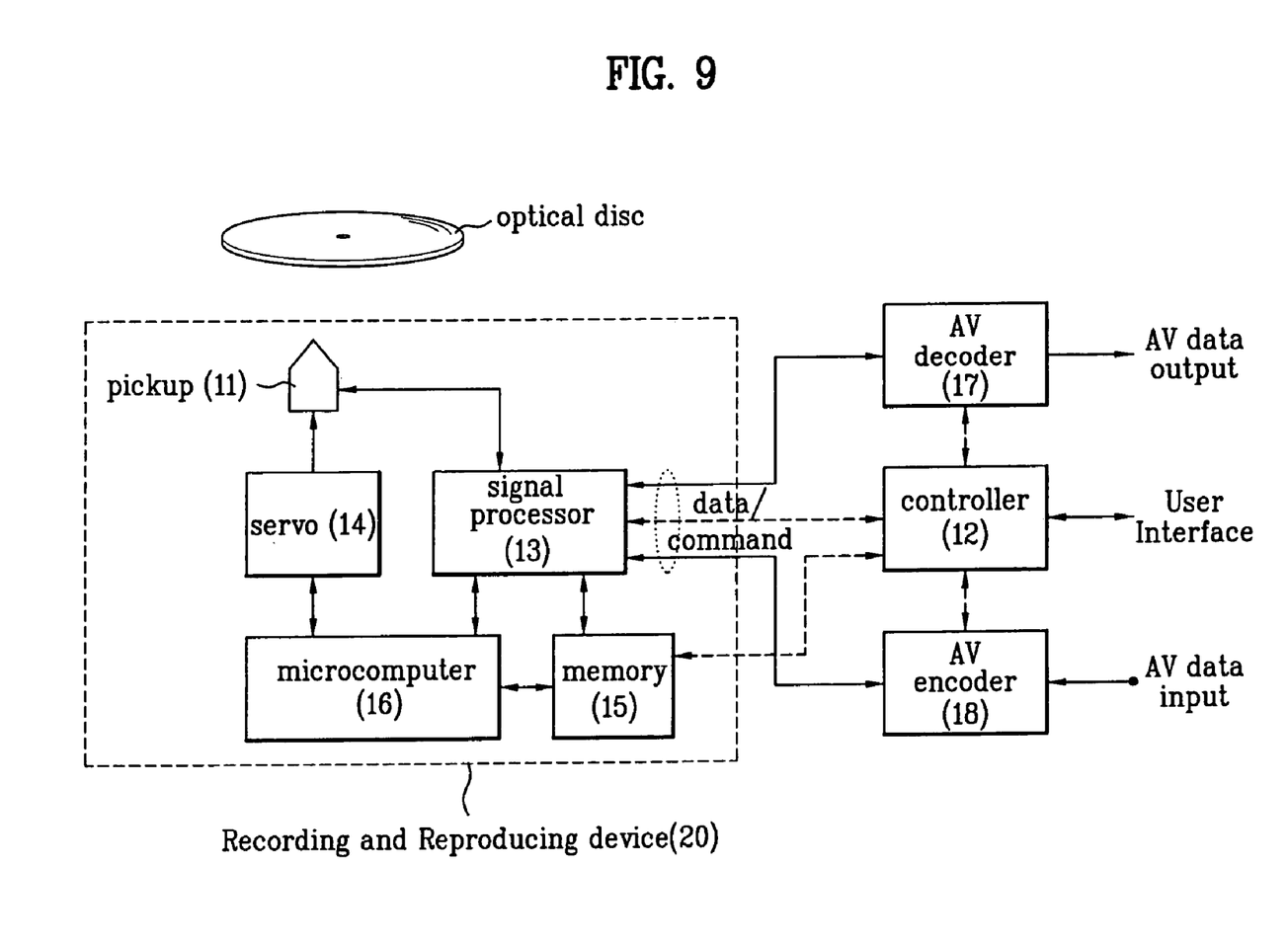
FIG. 9 is a block diagram of an optical record/reproduction apparatus according to an embodiment of the present invention.

The information on the respective SRRs explained in FIGS. 2A to 3C is referred to as SRRI (sequential recording range information), and is recorded in a TDMA on the disc. The information of open SRRs currently existing within a disc includes the start addresses and the LRAs. This information is recorded as the SRRI. An optical record/reproduction apparatus, such as shown in FIG. 9, may acquire the latest SRRI to enable a reading of a recordable area (open SRR) and a record-completed area (closed SRR), and to determine where a next recording (e.g., NWA) may take place). Hence, the optical record/reproduction apparatus can record/reproduce the write-once optical disc.

Figure 4:
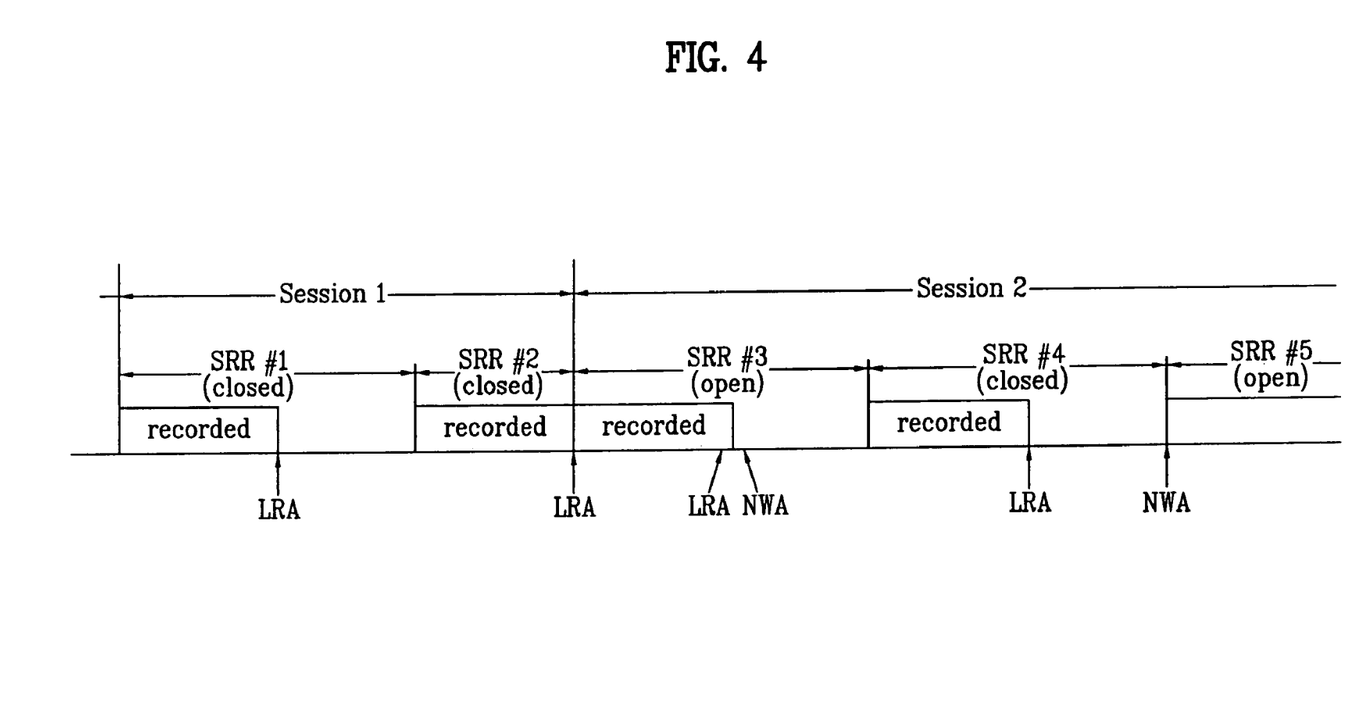
FIG. 4 is a diagram of a recording method according to an embodiment of the present invention.

FIG. 4 shows a recording method using SRR of the present invention and a session-applied case.

For instance, SRR#1 and SRR#2 are allocated within a session 1 on disc initiation to perform recording thereon, the corresponding session 1 is terminated, and a new session 2 is initiated. If so, SRR#1 and SRR#2 existing within the former session 1 are changed into closed SRRs, respectively so that the recording cannot further proceed within the session 1.

Subsequently, if SRR#3 and SRR#4 are allocated within the newly allocated session 2, SRR#5 automatically becomes an invisible SRR so that the SRR#3, SRR#4, and SRR#5 will become recordable areas. Yet, in order to allow the recording not to be further performed thereon, FIG. 4 shows a case that the SRR#4 is forcibly changed into a closed SRR. Namely, it is enough for at least one open SRR to exist within a recordable session. And, it is unnecessary for the entire SRRs to be open SRRs.

Hence, a final recording state of the disc shown in FIG. 4 can be confirmed from the SRRI recorded within the TDMA. From the state information for the SRRs recorded within the SRRI, it can be known that in the current session 2, the SRR#3 and SRR#5 became recordable areas (open SRRs), and that the session 1 (SRR#1 and SRR#2) is an area where the recording was already completed. Also, it can be known that SRR#4 has had recording already completed.

Figure 5:
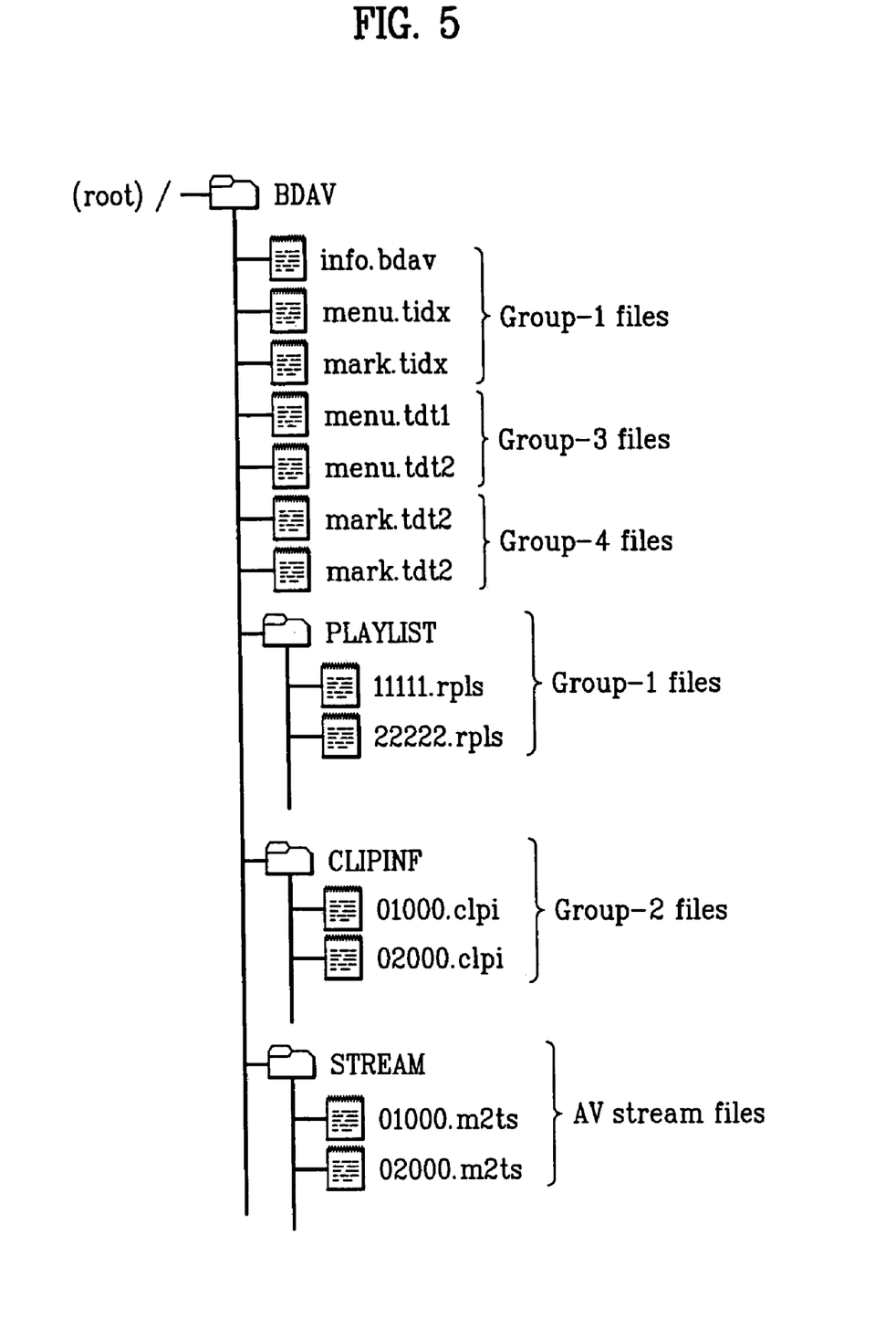
FIG. 5 and FIG. 6 are diagrams of file structures in a write-once optical disc according to embodiments of the present invention.
Figure 6:
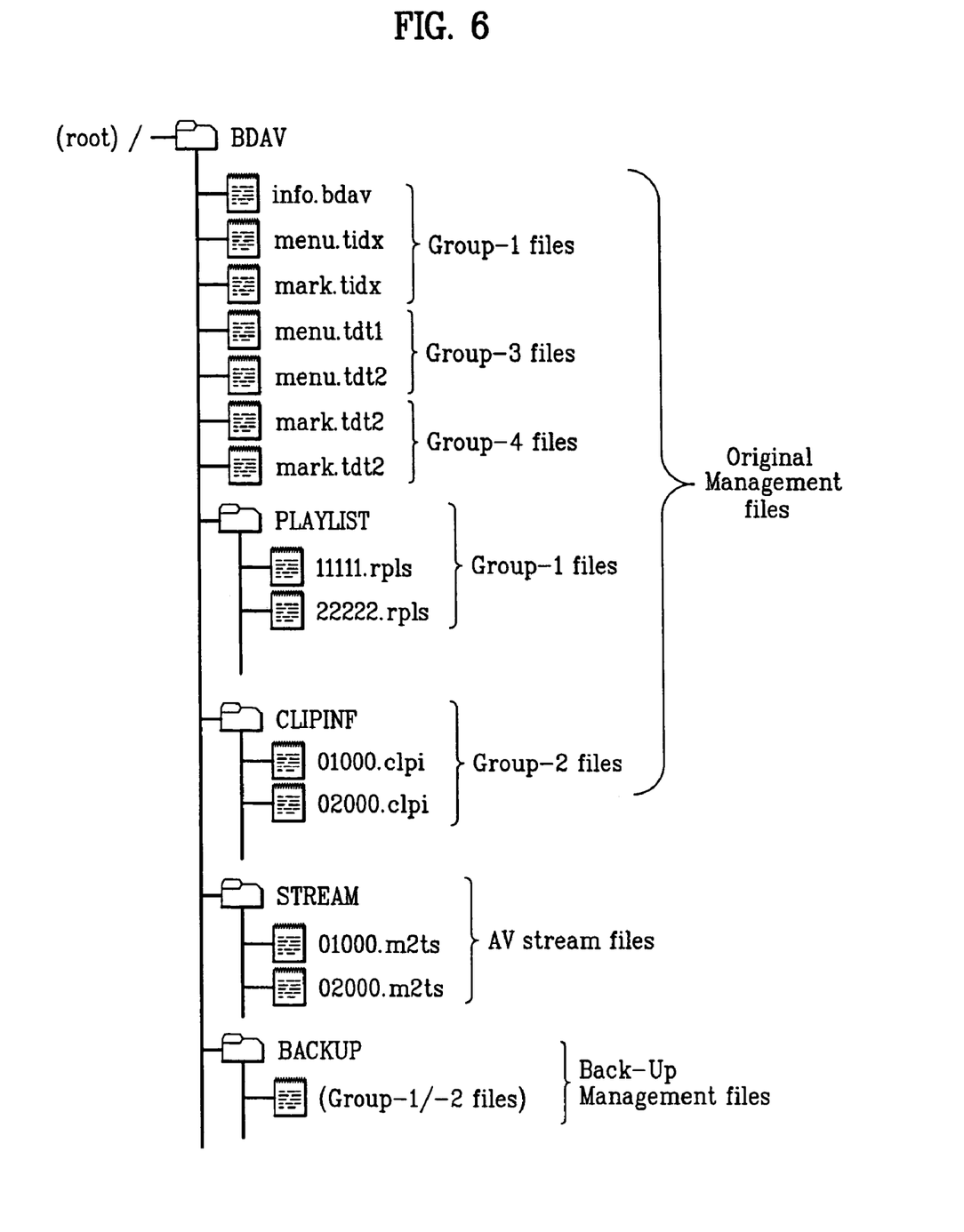

FIG. 5 and FIG. 6 are diagrams of file structures in a write-once optical disc according to embodiments of the present invention.

Referring to FIG. 5, at least one BD directory BDAV exists beneath one root directory. In the BD directory BDAV, an info file info.bdav as general file (higher file) information to secure interactivity with a user; menu files menu.tidx, menu.tdt1, menu.tdt2, mark files mark.tidx, mark.tdt1, mark.tdt2; and the like are included. The BD directory BDAV further includes three directories having reproduction information of data substantially recorded within the disc and information about reproducing the recorded data and the like. The three directories are a playlist directory PLAYLIST, a clipinfo directory CLIPINF, and a stream directory STREAM.

Specifically, files 01000.m2ts and 02000.m2ts for video and audio streams recorded according to specific formats within a disc are recorded within the stream directory STREAM. Each of the stream files 01000.m2ts and 02000.m2ts is, for example, AV (audio and/or video) or PC (personal computer) data recorded on a specific area within the disc.

The clipinfo directory CLIPINF includes clipinfo files *.clpi in one-to-one correspondence to the AV stream files (*.m2ts), respectively. The clipinfo directory CLIPINF is a directory in which, for example, management files including attribute information and reproduction timing information of the corresponding stream (*.m2ts) files are recorded. Specifically, in the BD specifications, the one-to-one corresponding stream file (*.m2ts) and clipinfo file (*.clpi) are collectively named a 'clip'. Hence, the file '01000.clpi' within the clipinfo directory CLIPINF includes the attribute information for the like named stream file '01000.m2ts' within the stream directory STREAM, and the files '01000.clpi' and '01000.m2ts' form one clip.

The playlist directory PLAYLIST includes playlist files (*.rpls), and each of the playlist files (*.rpls) includes at least one playitem PlayItem. Each playitem references at least a portion of one clip for reproduction. Hence, the playlist file (*.rpls) is a basic reproduction management file that performs reproduction of specific clip combinations by the combination of at least one playitem PlayItem.

In the above-configured file structure, the management files having the same or similar attribute may be categorized into groups or types. For instance, Group-1 may include the info file info.bdav, the menu file menu.tidx, the mark file mark.tidx having the entire mark information, and the playlist files *.rpls. Group-2 may include the clipinfo files *.clpi. Group-3 may include the menu files menu.tdt1 and menu.tdt2 having lower information among the menu information. And, Group-4 may include the mark files mark.tdt1 and mark.tdt2 having lower information among the mark information. By the file structure of FIG. 5, the management files may be categorized into four data types or groups.

FIG. 6 shows another file structure in a write-once optical disc according to an embodiment of the present invention.

Referring to FIG. 6, backup management files for Group-1 and Group-2 files among the management files of the file structure of FIG. 5 are further provided as a type or group of data. As the file information recorded in Group-1 and Group-2 may be more important than the files of the other groups, the backup management files are provided to protect these files. Optionally, it is apparent other backup files for Group-3 and/or Group-4 in FIG. 5 may be provided as well.

Specifically, in the present embodiment of FIG. 6, a 'BACKUP' directory is provided beneath a BDAV directory in which the backup management files are included. In such a file structure, original management files including the four groups, the backup management files including the two groups, and AV stream files *.m2ts are included.

Figure 7A:
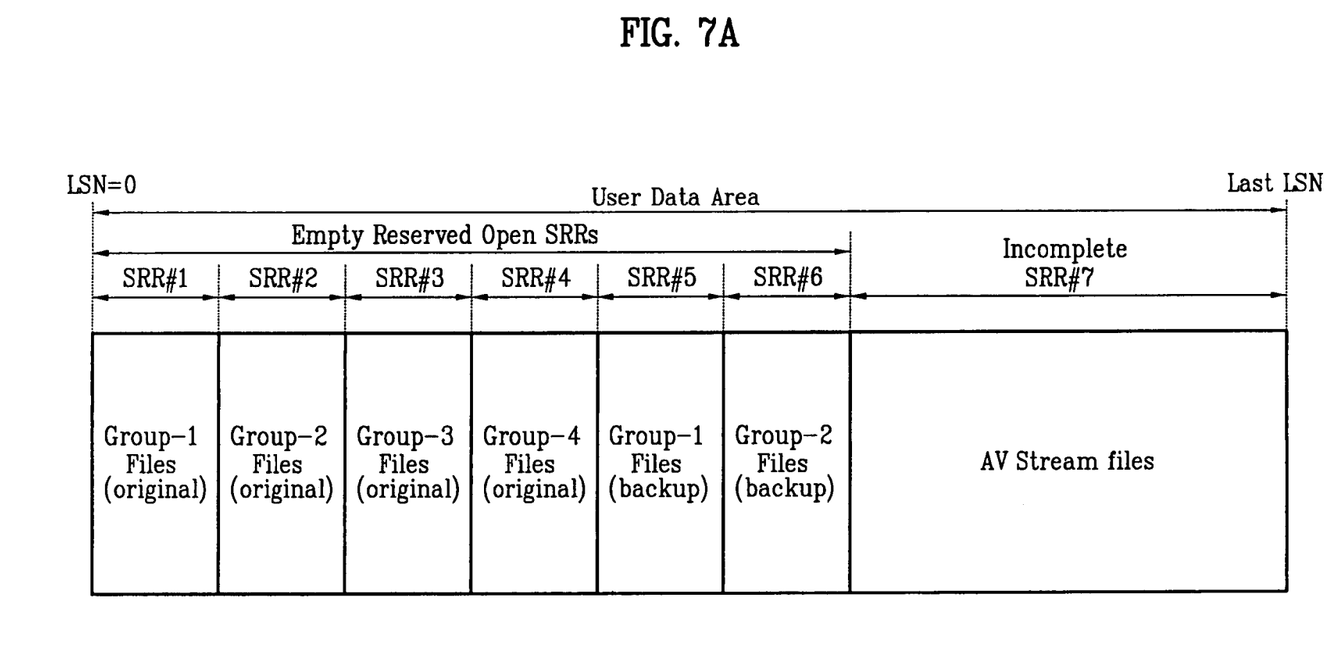
FIG. 7A and FIG. 7B are diagrams of a method of allocating SRR in a write-once optical disc and recording file information in the allocated SRR according to an embodiment of the present invention.
Figure 7B:
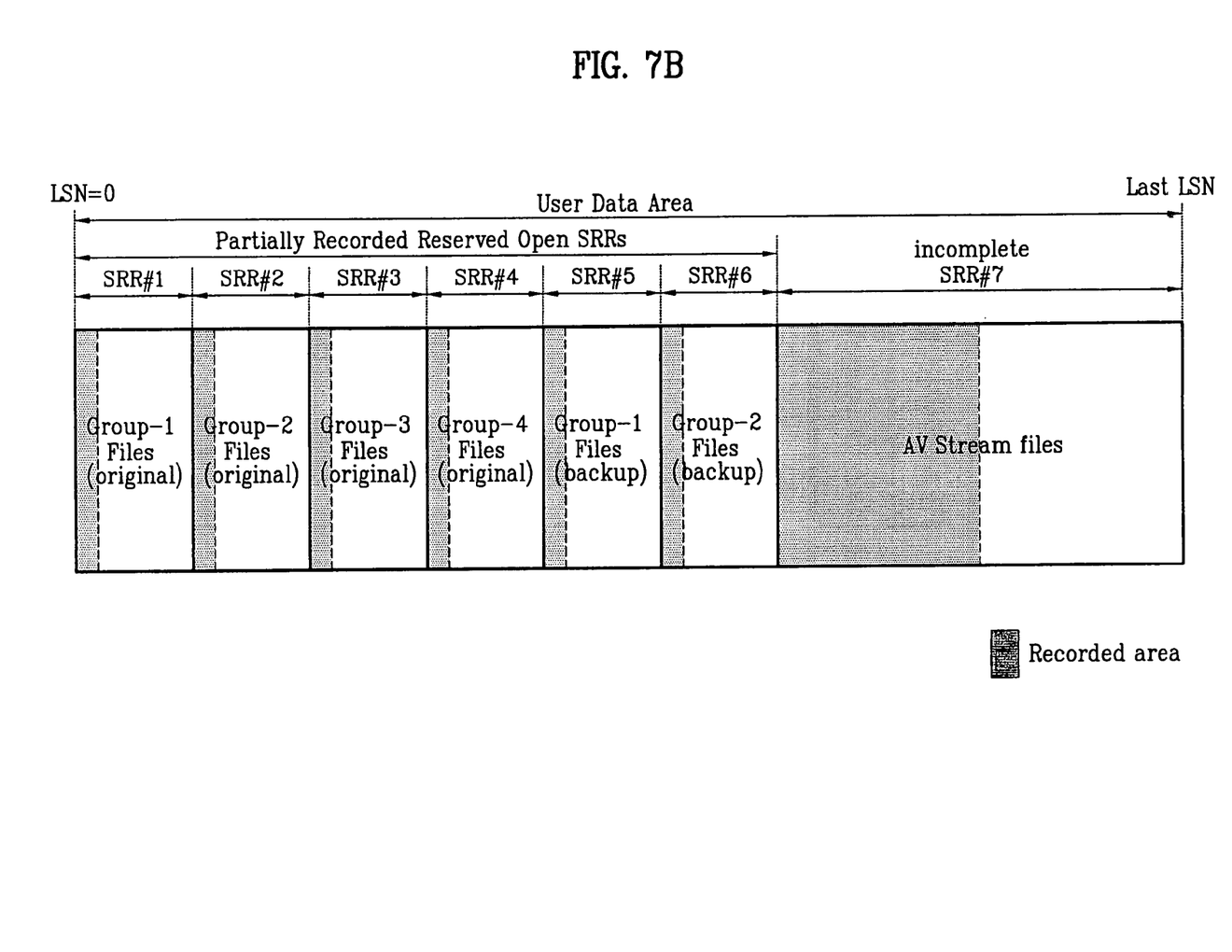

FIG. 7A and FIG. 7B show methods of recording the aforesaid files on a disc according to embodiments of the present invention. For instance, information may be recorded on a disc according to the file structure shown in FIG. 6.

FIG. 7A shows a format that a recording area for each file is allocated a SRR prior to substantial recording on a disc; namely, SRRs are pre-allocated for each file and/or group of files. For instance, in case of recording the file structure of FIG. 6, recording areas are allocated to form seven open SRRs.

Namely, SRR#1 to SRR#6 are allocated as empty open SRRs, respectively and SRR#7, at a most outer circumference, automatically becomes an invisible SRR.

In this case, the open SRR#1 to SRR#7 are respectively pre-allocated for the different types of information or data. Namely, as shown, the four groups Group-1 to Group-4 in the file system of FIG. 6 are pre-allocated to and will be recorded in SRR#1 to SRR#4, respectively. The backup management files including two groups in FIG. 6 are pre-allocated to and will be recorded in the SRR#5 and SRR#6, respectively. And, the AV stream files are pre-allocated and will be recorded in the SRR#7.

In allocating SRR#1 to SRR#6, the size of each SRRs is allocated a flexible size greater than (usually twice) the predicted size needed to store the corresponding information. For instance, about 4 Mbytes are allocated to SRR#1 (Group-1 recording area), which is actually expected to have a maximum of 2 Mbytes; about 4 Mbytes are allocated to SRR#2 (Group-2 recording area), which is actually expected have a maximum 2 Mbytes; about 7 Mbytes are allocated to SRR#3 (Group-1 recording area), which is actually expected to have a maximum 3.5 Mbytes; and about 32 Mbytes are allocated to SRR#4 (Group-4 recording area), which is actually expected to have a maximum 16 Mbytes.

About 4 Mbytes, equal to those of SRR#1, are allocated to SRR#5, which is an area for recording a backup file of SRR#1 therein. And, about 4 Mbytes, equal to those of SRR#2, are allocated to SRR#6, which is an area for recording a backup file of SRR#2 therein.

It will also be understood that the information on the SRRs is recorded in an SRRI in the TDMA.

Alternatively, according to other embodiments, SRR#5 and SRR#6 for recording the backup files therein are not allocated in the early stage. Instead, after termination of recording user data in the AV stream file, the SRR#5 and SRR#6 allocations are performed on an area following the area where the AV stream is recorded. Alternatively, the SRR#5 and SRR#6 are allocated to follow the AV stream file (SRR#7). In this case, it is apparent that 'SRR#number' is given according to a sequence allocated from an inner disc circumference.

FIG. 7B shows a case of recording associated file management information in SRR#1~SRR#6 after recording an AV stream file in SRR#7 with the allocated state of FIG. 7A.

Once partial recording on open SRR#1~SRR#6 is completed, the corresponding SRRs become partially recorded open SRR#1~SRR#6, invisible SRR#7 will be changed into incomplete SRR#7, and start address and LRA information of the entire SRRS will be recorded in an SRRI within a TDMA.

Specifically, by sorting management files per attribute, the area for recording the corresponding file information is previously allocated prior to recording the AV stream file of real user data. Hence, the file information having the same file attribute are not scattered over the entire disc, but are efficiently recorded and managed.

Figure 8:
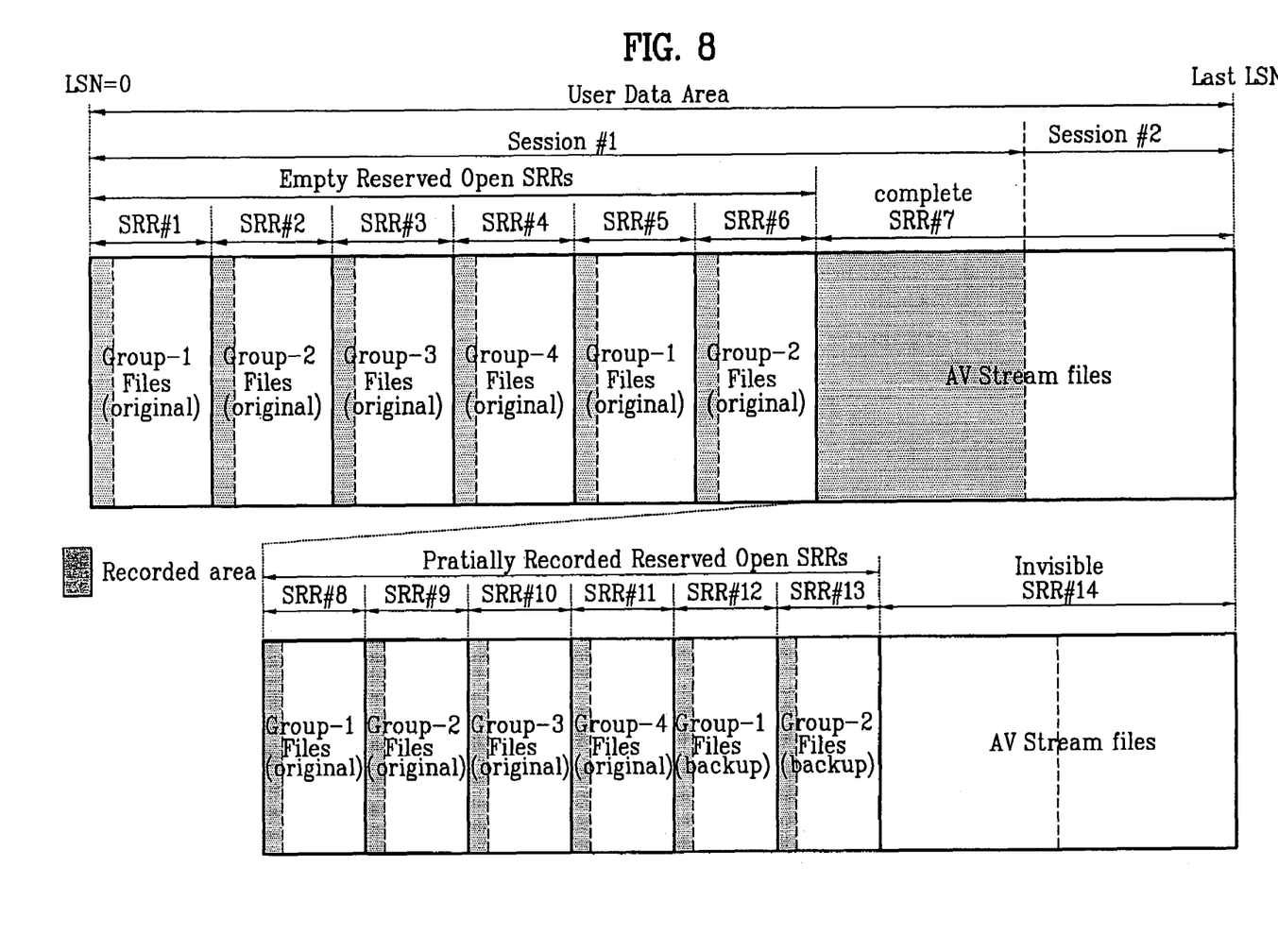
FIG. 8 is a diagram of a method of allocating SRR and recording file information in the allocated SRR in a multi-session record system of a write-once optical disc according to an embodiment of the present invention.

FIG. 8 is a diagram of a method of allocating SRR and recording file information in the allocated SRR in a multi-session record system of a write-once optical disc according to an embodiment of the present invention.

For instance, in case that a new session is generated after closing session 1 under the disc state of FIG. 7B, all SRR#1~SRR#7 existing within the former session 1 are changed into closed SRRs and seven open SRRs having the same format of the former SRRs are generated in the new session 2. The seven open SRRs are SRR#8 to SRR#14, respectively.

Moreover, management file information recorded in SRR#1~SRR#6 of the session 1 may be copied to the newly generated SRR#8~SRR#13, respectively.

Thus, the information recorded in SRR#1~SRR#6 of the former session 1 is copied to SRR#8~SRR#13 areas, the AV stream files of the current session 2 are recorded in SRR#14, and the management file information of the AV stream files is recorded in SRR#8~SRR#13.

By performing the recording in the above manner, the management file information within an entire optical disc may be collectively read despite reproduction of management file areas (e.g., SRR#8~SRR#13) existing within a last recordable session. Hence, efficiency in optical disc reproduction is enhanced.

An optical record/reproduction apparatus and an optical disc record/reproduction method using the same according to an embodiment of the present invention will be explained below with reference to FIG. 9.

FIG. 9 shows a configuration of an optical record/reproduction apparatus according to an embodiment of the present invention.

Referring to FIG. 9, an optical record/reproduction apparatus according to the present invention basically includes a pickup unit 11 reading out and/or recording data and file system information; a servo 14 controlling an operation of the pickup unit 11; a signal processing unit 13 restoring a reproduction signal received from the pickup unit 11 into a specific signal value or modulating a signal to be recorded on the optical disc via the pickup unit 11; a memory 15 temporarily storing the file system information read from the optical disc; and a microcomputer 16 controlling the operation of the servo 14, the signal processor 13 and the memory 15. These above-described elements may be collectively called a record/reproduction unit 20.

A control unit 12, which is an element for controlling overall operations of the optical record/reproduction apparatus, receives a user command via a user interface and then delivers the received user command to the microcomputer 16 within the record/reproduction unit 20. As such the apparatus of FIG. 9 may operate according to the user command. Specifically, the control unit 12 generates a record/reproduction command by utilizing the SRRI and the like within a TDMA, and then delivers the generated command to the record/reproduction unit 20.

An AV decoder 17 decodes output data according to a control of the control unit 12 to provide the decoded data to a user. In order to perform a function of recording a signal on the optical disc, an AV encoder 18 converts an input signal to a specifically formatted signal such as an MPEG2 transport stream according to a control of the control unit 12, and provides the converted signal to the signal processing unit 13 within the record/reproduction unit 20.

A recording method of a write-once optical disc using the optical record/reproduction apparatus according to an embodiment of the present invention will be explained in detail below.

Once the write-once optical disc is loaded, the control unit 12 pre-allocates open SRRs for recording management files categorized per attribute and an area for recording stream files, respectively. For instance, in case of FIG. 7A, after forming six open SRRs SRR#1~SRR#6 for different types or groups of management files, one invisible SRR SRR#7 for stream file recording is formed. Based, for example, on user input, the control unit 12 may deliver a record command for recording user-specific data in a stream file recording area to the record/reproduction unit 20. And, the control unit 12 delivers the contents to be recorded in the open SRRs SRR#1~SRR#6 for management file recording to the record/reproduction unit 20 as well.

The record/reproduction unit 20 having received the record command of the control unit 12 drives the pickup 11 via the servo 14 to complete the recording of the corresponding data in the areas requested by the control unit 12, and then records states of the entire SRRs currently existing within the disc in a TDMA as SRRI.

In doing so, the information recorded as SRRI includes addresses of the open SRRs, start addresses of the respective SRRs, normal-data-recorded LRA information, and the like. The SRRI will be referred to by the control unit 12 to be utilized in generating a new record command.

Accordingly, the file allocation method of the high density optical disc and the optical disc recording method using the same according to at least one embodiment of the present invention provide reliable and robust management file information, thereby enabling efficient record/reproduction of the optical disc.

While the invention has been disclosed with respect to a limited number of embodiments, those skilled in the art, having the benefit of this disclosure, will appreciate numerous modifications and variation there from. For example, while described with respect to a BD optical disc in several instances, the present invention is not limited to this standard of optical disc or to optical discs. It is intended that all such modifications and variations fall within the spirit and scope of the invention.

What is claimed is:

1. A recording method of a write-once recording medium, comprising: allocating a first plurality of separate recording areas of a user data area on the recording medium; recording different types of data in the first plurality of separate recording areas respectively using a recording device, the data recorded in at least one recording area from among the first plurality of separate recording areas being a same data type; allocating a second plurality of separate recording areas of the user data area, after closing the first plurality of separate recording areas; and recording the different types of data in the second plurality of separate recording areas respectively using the recording device, the types of data recorded in the second plurality of separate recording areas being same as the types of data recorded in the first plurality of separate recording areas respectively, wherein the user data area is a volume space lying between two spare areas of the recording medium, the two spare areas being for defect management.

2. The method of claim 1, wherein at least one of the first plurality of separate recording areas is for storing managing information for managing the recording medium.

3. The method of claim 2, wherein at least another one of the first plurality of separate recording areas is for storing a copy of data in the at least one of the separate recording areas for storing management information.

4. The method of claim 1, wherein the user data area is a volume space that does not include a spare area, the spare area being an area of the recording medium for defect management.

5. The method of claim 1, wherein the allocating steps allocates the first plurality of separate recording areas prior to recording such that each separate recording area is pre-allocated.

6. The method of claim 5, wherein the allocating step pre-allocates at least two of the first plurality of separate recording areas for respectively recording different types of data.

7. The method of claim 6, wherein at least one of the first plurality of separate recording areas is for storing managing Information for managing the recording medium.

8. The method of claim 7, wherein at least another one of the first plurality of separate recording areas is for storing a copy of data in the at least one of the separate recording areas for storing management information.

9. The method of claim 6, wherein the user data area is a volume space that does not include a spare area, the spare area being an area of the recording medium for defect management.

10. The method of claim 6, wherein the user data area is a volume space lying between two spare areas of the recording medium, the two spare areas being for defect management.

11. The method of claim 5, wherein the user data area is a volume space that does not include a spare area, the spare area being an area of the recording medium for defect management.

12. The method of claim 5, wherein the user data area is a volume space lying between two spare areas of the recording medium, the two spare areas being for defect management.

13. The method of claim 5, wherein the first and second pluralities of separate recording areas are for sequential recording.

14. The method of claim 1, wherein the recording medium is an optical disc.

15. The method of claim 1, further comprising:
recording information about each of the first and second pluralities of separate recording areas in a temporary defect management area on the recording medium.

16. The method of claim 1, wherein the first plurality of separate recording areas and the second plurality of separate recording areas are provided in separate part of a user data.

17. A write-once recording medium having a data structure for managing recording of the recording medium, comprising: a user data area at least partially dividable into a first plurality of separate recording areas and a second plurality of separate recording areas, the first plurality of separate recording areas being configured for recording different types of data respectively, the data recorded in at least one recording area from among the first plurality of separate recording areas being a same data type, the second plurality of separate recording areas being configured for recording different types of data respectively, the types of data recorded in the second plurality of separate recording areas being same as the types of data recorded in the first plurality of separate recording areas respectively, wherein the user data area is a volume space lying between two spare areas of the recording medium, the two spare areas being for defect management.

18. A write-once recording medium of claim 17, wherein the first plurality of separate recording areas and the second plurality of separate recording areas are provided in separate parts of the user data area.

19. A recording apparatus of a write-once recording medium, comprising: a recording device configured to record data on the recording medium; and a controller, operably coupled to the recording device, configured to control the recording device to allocate a first plurality of separate recording areas of a user data area of the recording medium, the controller being configured to control the recording device to record different types of data in the first plurality of separate recording areas respectively such that the data recorded in at least one recording area from among the first plurality of separate recording areas is of same data type, the recording device being configured to allocate a second plurality of separate recording areas of the user data area after closing the first plurality of separate recording areas, the controller being configured to control the recording device to record the different types of data in the second plurality of separate recording areas respectively such that the types of data recorded in the second plurality of separate recording areas are same as the types of data recorded in the first plurality of separate recording areas respectively, wherein the user data area is a volume space lying between two spare areas of the recording medium, the two spare areas being for defect management.

20. The recording apparatus of a write-once recording medium of claim 19, wherein the first plurality of separate recording areas and the second plurality of separate recording areas are provided in separate parts of the user data area.

* * * * *